(12) United States Patent
Weissinger

(10) Patent No.: US 11,070,069 B2
(45) Date of Patent: Jul. 20, 2021

(54) DEVICE AND METHOD FOR POWER MANAGEMENT OF A TYPE-C CHARGER

(71) Applicant: MOTOROLA SOLUTIONS, INC., Chicago, IL (US)

(72) Inventor: Frederick J. Weissinger, Duluth, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 612 days.

(21) Appl. No.: 15/908,100

(22) Filed: Feb. 28, 2018

(65) Prior Publication Data

US 2019/0267817 A1 Aug. 29, 2019

(51) Int. Cl.
*H02J 7/00* (2006.01)
*H01R 107/00* (2006.01)
*H01R 24/62* (2011.01)

(52) U.S. Cl.
CPC ............ *H02J 7/0027* (2013.01); *H02J 7/007* (2013.01); *H02J 7/0042* (2013.01); *H01R 24/62* (2013.01); *H01R 2107/00* (2013.01)

(58) Field of Classification Search
CPC ..................................................... H02J 7/0027
See application file for complete search history.

(56) References Cited

U.S. PATENT DOCUMENTS

| 2011/0031171 A1* | 2/2011 | Henig | ................... H01M 10/42 210/85 |
| 2017/0222450 A1* | 8/2017 | Lee | ........................... H02J 7/00 |
| 2018/0120910 A1* | 5/2018 | Farkas | .................... G06F 1/189 |

* cited by examiner

*Primary Examiner* — David V Henze-Gongola
(74) *Attorney, Agent, or Firm* — Michael Best and Friedrich LLP

(57) ABSTRACT

A charger including a USB type-C input port configured to receive power from a power supply, a plurality of output ports each configured to couple to one of a plurality of devices to be charged, and a control logic circuit operatively coupled to the plurality of output ports and configured to manage power to the plurality of output ports. The control logic circuit is hardwired to prioritize power to a first output port of the plurality of output ports when the output port is coupled to a device such that an amount of the received power is allocated to the output port instead of at least one of the plurality of output ports that is coupled to a second device and the control logic circuit does not include an electronic processor.

19 Claims, 3 Drawing Sheets

DEVICE AND METHOD FOR POWER MANAGEMENT OF A TYPE-C CHARGER

BACKGROUND OF THE INVENTION

Battery-powered, portable electronic devices (which are, more generally, electrical devices) are used for a variety of purposes. For example, public safety personnel (police officers, fire fighters, paramedics or other first responders) may use communication devices, recording devices, and other battery-powered portable electronic devices that are useful to them during the performance of their duties. In another example, people engaging in hiking, mountain or rock climbing, hunting, or similar outdoor recreational activities may use a battery-powered portable electronic device (for example, a navigation device) to enhance their recreational experience.

Power transfer systems (for example, chargers) have been implemented to recharge the batteries of such devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
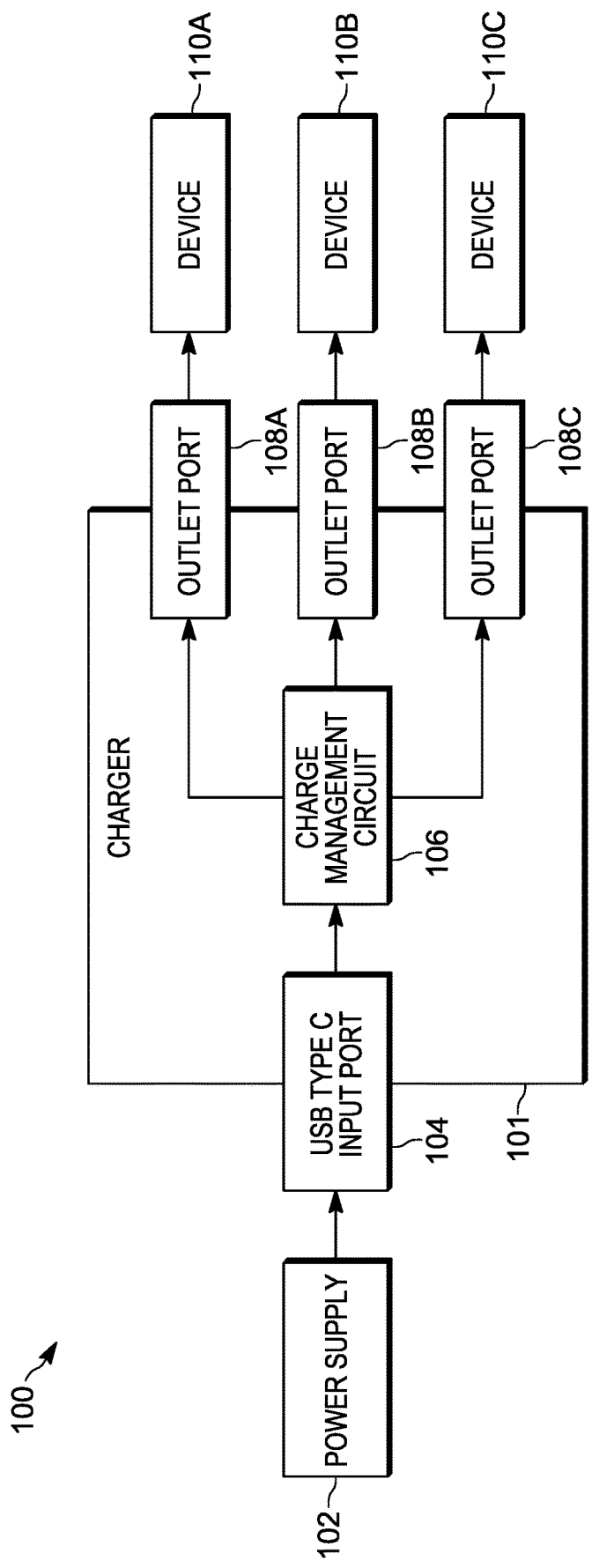
FIG. 1 illustrates a system including a charger in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In the case of device charging, a simple, compact charger is desirable. Many chargers use a USB Type-C connection interface with various types of electronic devices. USB Type-C is a 24-pin rotationally-symmetrical connector that provides an interface between a host device and an accessory. A USB Type-C connection interface provides several advantages over prior USB-related connection interfaces, such as smaller size, higher power rating, and high-speed data transfer.

Some of these chargers maybe configured to charge multiple devices at the same time. In some cases, there may not be enough power supplied to the charger to support the charging of all connected devices. As a consequence, there is a risk of collapsing the power supply when attempting to charge multiple devices simultaneously. Accordingly, embodiments described herein provide, among other things, a USB type-C input charger for charging multiple electrical devices.

One example embodiment provides a charger including a USB type C input port configured to receive power from a power supply, a plurality of output ports each configured to couple to one of a plurality of devices to be charged, and a control logic circuit operatively coupled to the plurality of output ports. The control logic circuit is configured to manage power to the plurality of output ports. The control logic circuit is hardwired to prioritize power to a first output port of the plurality of output ports when the output port is coupled to a device such that an amount of the received power is allocated to the output port instead of at least one of the plurality of output ports that is coupled to a second device, wherein the control logic circuit does not include an electronic processor.

Another example embodiment provides a charger. The charger includes a USB type-C input port configured to receive power from a power supply, a first output port configured to provide power to a first device, a second output port configured to provide power to a second device, and a control logic circuit. The control logic circuit is configured to, while the first device is coupled to the first output port and the second device is coupled to the second output port, provide at least a portion of the received power to the first device via the first output port and determine whether there is an amount of the received power available to charge the second device via the second output port while providing the at least a portion of the received power to the first device. The control logic circuit is further configured to, when there is an amount of the received power available to charge the second device, provide the amount of the received power to the second device via the second output port.

For ease of description, some or all of the example systems presented herein are illustrated with a single example of each of its component parts. Some examples may not describe or illustrate all components of the systems. Other example embodiments may include more or fewer of each of the illustrated components, may combine some components, or may include additional or alternative components.

Some multiple device chargers employ a universal serial bus (USB) type-C (also known as USB-C) power input connector. In many cases, the power supply is unable to provide the demanded amount of power to charge multiple devices at the same time without collapsing the power supply. Thus, a USB type-C input multiple device charger that allocates power would be useful.

FIG. 1 illustrates a system 100 for charging multiple devices. The system 100 includes a charger 101 and a power supply 102. The charger 101 includes a USB type-C input port 104, a charge management circuit 106, and a plurality of output ports 108A-C. Although the illustrated embodiment of the charger 101 includes three output ports 108A-C, it should be understood that the charger 101 may have more output ports but no less than two. Each of the plurality of output ports 108A-C is configured to couple to a device 110A-C (respectively) to be charged. The charger 101 is configured to receive power from the power supply 102 via the USB type-C input port 104 and charge one or more devices 110A-C, specifically a battery (not shown) of each device, when the device is coupled to one of the output ports 108A-C.

For ease of description, the ports of the charger 101 are termed as inputs and outputs in the context of the power transmission of the charger 101. It should be understood that, in some embodiments, one or more of the ports may be bidirectional (in terms of power and/or communications) and that the terms inputs and outputs should not, in this context be considered to exclude bidirectionality.

Figure 2:
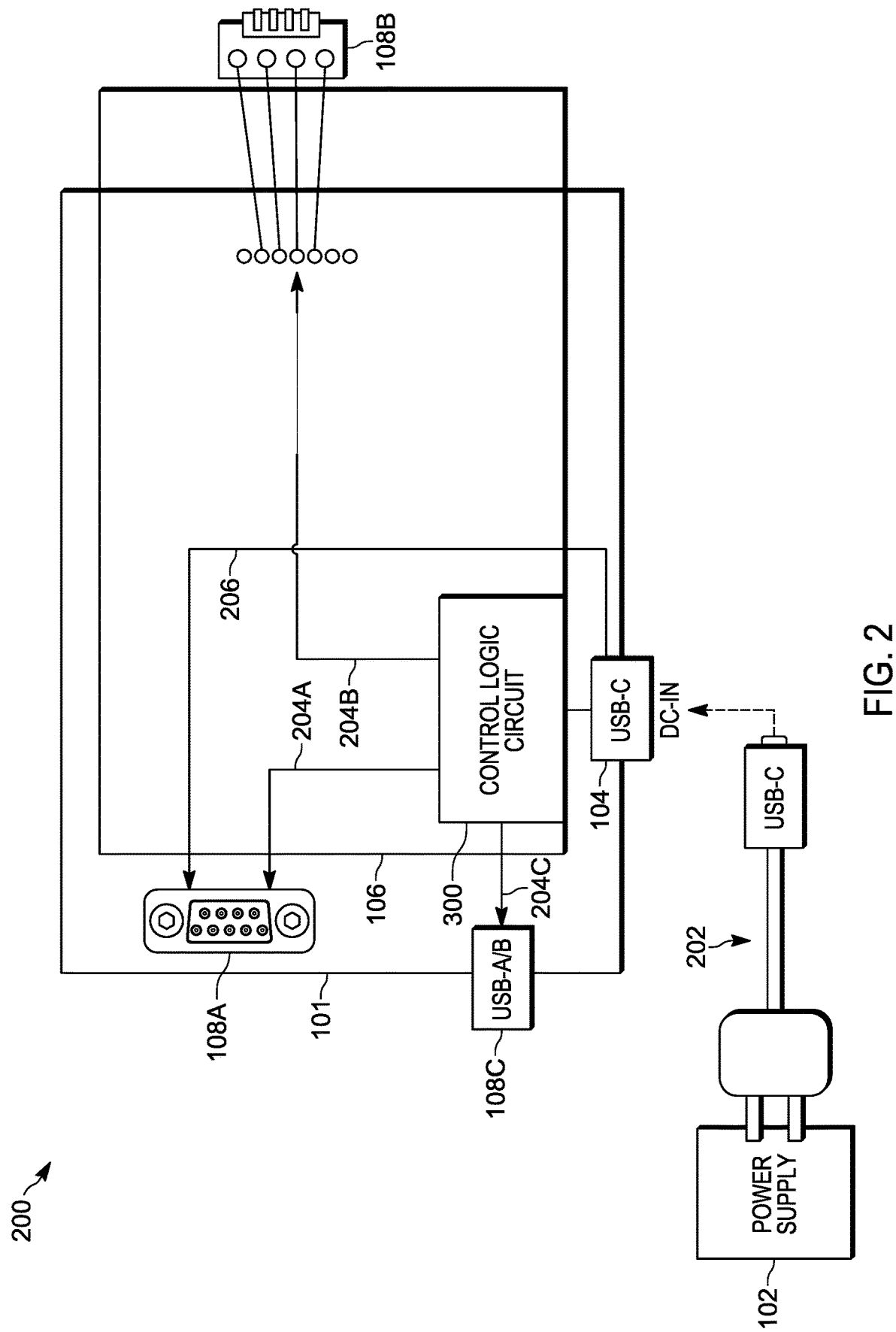
FIG. 2 is a block diagram of the charger of FIG. 1 in accordance with some embodiments.

The power supply 102 may be a wall power adaptor or a portable battery. The portable battery may be a portable battery module or a battery of a portable device (for example, a laptop or a vehicle). In some embodiments, the power supply 102 may be a USB type-C port configured to be coupled to the input 104. In further embodiments, the power supply 102 is coupled to the input port 104 via an adaptor 202 (FIG. 2) including a USB-C connector 202A (FIG. 2).

The output ports 108A-C may be any kind of standard output port, including USB type-C. In some embodiments, at least one of the output ports 108A-C may be a custom port specific to a particular device. Some or all of the output ports 108A-C may be the same kind.

The devices 110A-C may be various battery-powered devices. For example, a device may be a two-way radio, a smart telephone, a tablet computer, a smart wearable device, or the like. In some embodiments, one or more of devices itself is a battery that is removed from an electronic device in order for the battery to be charged. Some or all of the devices 110A-C may be the same kind of device.

As explained in more detail below, the charger 101 (specifically the charge management circuit 106) is configured (in this case, hardwired) to prioritize power from the power supply 102 to a particular output port 108A-C when more than one device is coupled to the output ports of the charger 101. Depending on which of the output ports 108A-C has a device 110A-C coupled to it, the charge management circuit 106 divides and delivers the power from the power supply 102 to the connected devices. The amount of power delivered to each connected device directly correlates to the particular output port of the charger 101 to which the device is connected (as well the particular output ports that other devices are connected to).

FIG. 2 illustrates a detailed block diagram 200 of the system 100 of FIG. 1. In the example illustrated, the charge management circuit 106 includes a control logic circuit 300. The control logic circuit 300 delivers power to the output ports 108A-C via power lines 204A-C. The control logic circuit 300, as explained in more detail below, is hardwired to prioritize power to an output port of the plurality of output ports when the output port is coupled to a device, such that an amount of the received power is allocated from at least one of the plurality of output ports that is coupled to a second device. The charge management circuit 106 may include additional circuitry and components. For example, the charge management circuit 106 may include protection circuitry (not shown). In some embodiments, the charger 101 includes one or more communication/data lines (for example, data line 206) between the input port 104 and the output ports 108A-C. Such communication/data lines may be used by a device 110A-C, when coupled to the corresponding output port 108A-C, to communicate with a device that includes the power supply 102. In the example illustrated, output port 108A is configured to receive an electronic handheld device (for example, a two-way radio), output port 108B is configured to receive a battery for a separate electronic device, and output port 108C is configured to receive an accessory (for example, a wireless earpiece or body-worn camera).

Figure 3:
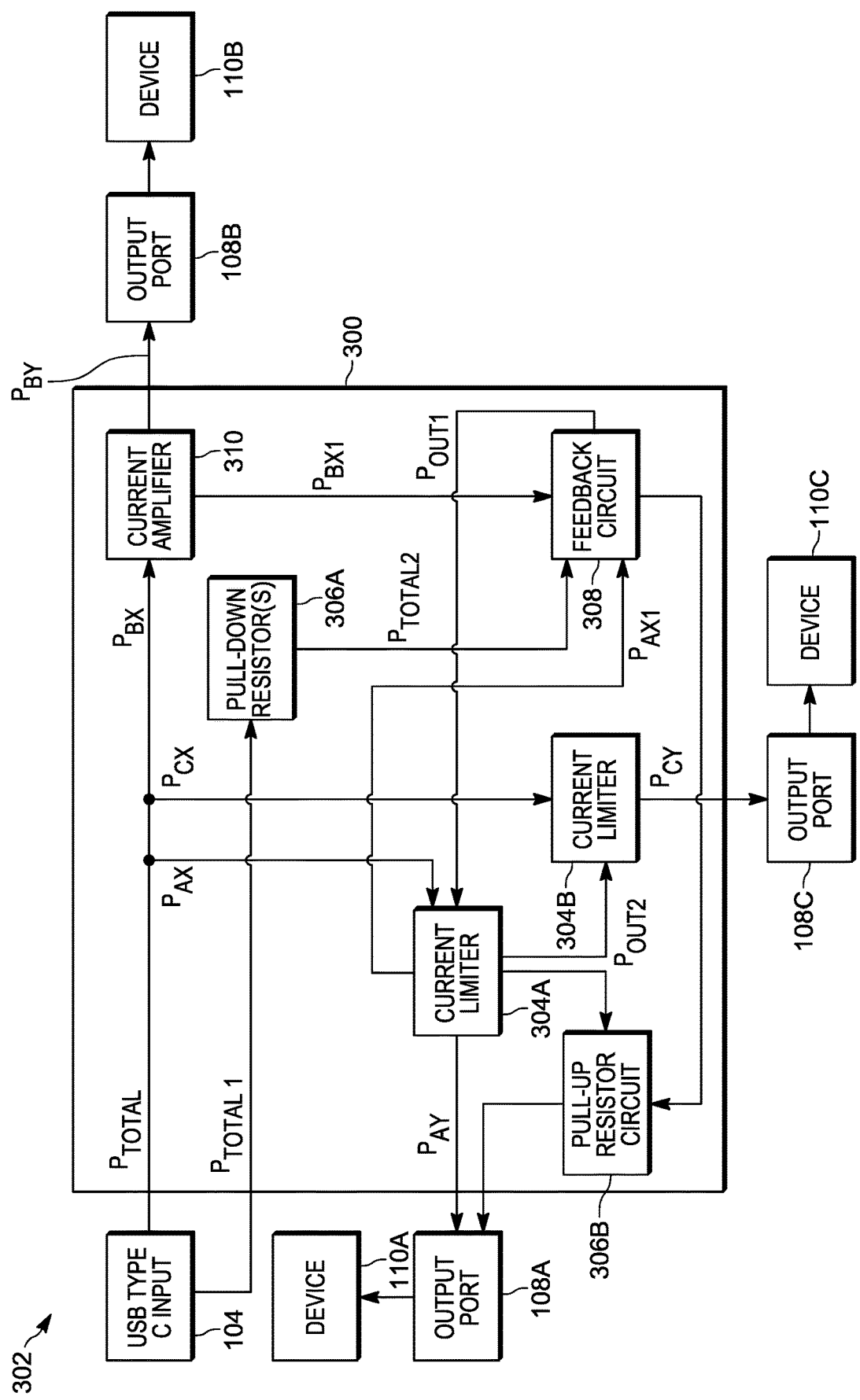
FIG. 3 is a block diagram of a control logic circuit of the charger of FIG. 2 in accordance with some embodiments.

FIG. 3 is a block diagram 302 of the control logic circuit 300. The control logic circuit 300 is configured to manage power received from the power supply 102 to the plurality of output ports 108A-C. Specifically, the control logic circuit 300 is hardwired to prioritize power to at least one output port of the plurality of output ports of the charger 101 (when the output port is coupled to a device) such that an amount of the received power is allocated from at least one of the plurality of output ports that is coupled to a second device.

Power received from the power supply 102 through the USB type-C input port 104 ($P_{total}$) is split between a current limiter 304A, a current limiter 304B, and a current amplifier 310. The current limiter 304A receives a portion of the total supply power ($P_{AX}$) (at least a portion of the power not taken by the current limiter 304B or the current amplifier 310) and provides power corresponding to the amount of the portion ($P_{AY}$) to the output port 108A when coupled to the device 110A. The current amplifier 310 receives a second portion of the total supply power ($P_{BX}$) and amplifies the power received ($P_{BY}$) and delivers the power to the output port 108B when the device 110B is connected.

One or more pull-down resistors 306A also receive power from the USB type-C input port 104 ($P_{total1}$) the amount of which corresponds to the total amount of power available from the port 104 ($P_{total}$). For example, the power supply 102 may include one or more pull-up resistors (not shown) whose resistive value/current output indicates the total amount of power available from the power supply 102 (for instance, when the input 104 is coupled to a USB type-C port of the power supply 102). In some embodiments, the power supply 102 may include a single pull-up resistor whose resistive value/current output indicates the total amount of power available from the power supply 102. The amount of power pulled by the pull-down resistors 306A ($P_{total1}$) is then fed into a feedback circuit 308.

The feedback circuit 308 is configured to output an amount of power ($P_{out1}$) indicative of the amount of remaining power available to be allocated to one or more of the charging devices 110A-C. In the illustrated embodiment, the feedback circuit 308 receives the power from the pull-down resistors 306A ($P_{total2}$), the current limiter 304A ($P_{AX1}$), and the current amplifier 310 ($P_{BX1}$). The power from the pull-down resistors 306A ($P_{total2}$) correlates to the total amount of power available ($P_{total}$) to the circuit 300 from the USB type-C input port 104. The power from the current limiter 304A ($P_{AX1}$) correlates to the amount of power supplied to the output port 108A and device 110A ($P_{AX}$). Similarly, the power from the current amplifier 310 ($P_{BX1}$) correlates to the amount of power supplied to the output port 108B and device 110B ($P_{BX}$). The feedback circuit 308 may include an adder circuit and subtraction circuit (not shown) to produce an output corresponding to the total power from the USB type-C input 104 minus the sum of the power to the output ports 108A and 108B ($P_{total}-P_A+P_B=P_{out1}$). This output ($P_{out1}$) indicates the total amount of remaining power. The output ($P_{out1}$) may be used to further adjust the amount of power supplied to the either or both the output ports 108A ($P_{AY}$) and 108B ($P_{BY}$) or add the remaining power to the power supplied to the output port 108C to charge the device 110C ($P_{CY}$).

For example, as shown in the illustrated embodiment, the output from the feedback circuit 308 ($P_{out1}$) is fed to the current limiter 304A, which is further connected to the current limiter 304B. The current limiter 304A adjusts the amount of power supplied to the output port 108A ($P_{AY}$) based on the output from the feedback circuit 308 ($P_{out1}$).

In some embodiments, the current limiter 304A may be configured to increase the amount of power supplied to the output port 108A ($P_{AY}$) based on a result of a comparison between the output from the feedback circuit 308 ($P_{out1}$) and a predetermined threshold. In further embodiments, the control logic circuit 300 includes one or more pull-up resistor circuits between the current limiter 304A, current limiter 304B, and/or current amplifier 310 and the corresponding output port 108A-C (for example, pull-up resistor circuit 306B). The pull-up resistor circuit 306B is configured to adjust a total resistive value (the total electrical resistance) of itself. For example, the total resistive value of the pull-up resistor circuit 306B may be adjusted via a variable pull-up resistor or a plurality of resistors (not shown) configured to be switched into and out of the control logic circuit 300 via an electronic switching device (for example a transistor) based on the output from the feedback circuit 308. The total resistive value of the pull-up resistor circuit 306B may be adjusted based on the feedback circuit 308 via hardwired circuitry and components (not shown). In some embodiments, the amount of available power supplied to the output port 108A-C ($P_{AY}$, $P_{BY}$, and/or $P_{CY}$) is communicated or advertised to the coupled device 110A-C via the pull-up resistor circuit 306B. In other words, the control logic circuit 300 may be configured (or hardwired) to adjust a total resistive value of the pull-up resistor circuit 306B based on the output from the feedback circuit 308 ($P_{OUT1}$) wherein the total resistive value indicates the amount of power supplied to the one of the plurality of output ports (in the illustrated example, $P_{AY}$). In some embodiments, one or more of the output ports 108A-C may be a USB type-C port configured to communicate (advertise) the amount of available power at the output port ($P_{AY}$, $P_{BY}$, and/or $P_{CY}$) to the coupled device 110 A-C via an adjustable resistive value. Similarly, the current limiter 304B is also configured to adjust the amount of power supplied to the output port 108C ($P_{CY}$) based on the output from the feedback circuit 308 ($P_{out2}$). In some embodiments, the current limiter 304B is configured to increase the amount of power supplied to the output port 108C ($P_{CY}$) based on a result of a comparison between the output from the feedback circuit 308 ($P_{out2}$) and a second predetermined threshold. However, due to the configuration of the circuit, the current limiter 304A receives the output from the feedback circuit 308 ($P_{out1}$) before the current limiter 304B ($P_{out2}$). Thus, the current limiter 304A has first priority to the amount of remaining power available.

When one of the devices 110A-C is fully charged and/or is disconnected from one of the output ports 108A-C, the amount of available power ($P_{total1}$) increases, and the circuit 300 responsively allocates the power to the remaining output ports and, as a consequence, to devices that still need to be charged. In some embodiments, the control logic circuit 300 determines at least a portion of the received power available to allocate to the output port based on a charge level of a device 110A-C (specifically the battery of the device 110A-C) coupled to at least one of the plurality of output ports 108A-C. For example, the circuit 300 may be configured to determine when the device 110A and/or 110B are fully (or are close to being) fully charged and, in response, allocate more power to one or more of the other output ports 108A-C so that the other devices 110A-C charge faster.

Ideally, the control logic circuit 300 does not include an electronic processor. In other words, the priority charging of the charger 101 is implemented purely by hardwired circuitry and logic, not in software executed by, for example, a general purpose microprocessor.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A charger comprising:
    a USB type-C input port configured to receive power from a power supply;
    a plurality of output ports each configured to couple to one of a plurality of devices to be charged; and
    a control logic circuit operatively coupled to the plurality of output ports, the control logic circuit configured to manage power to the plurality of output ports,
    wherein the control logic circuit is hardwired to prioritize power to a first output port of the plurality of output ports when the first output port is coupled to a device such that an amount of the received power is allocated to the first output port instead of at least one of the remaining plurality of output ports that is coupled to a second device, and
    wherein the control logic circuit is non-programmable and does not include a general purpose microprocessor and wherein the allocation of the amount of received power to the first output port is performed independently of a general purpose microprocessor.

2. The charger of claim 1, wherein the control logic circuit is configured to allocate the amount of the received power to the first output of the plurality of output ports based on a charge level of a third device coupled to a second output port of the plurality of output ports.

3. The charger of claim 1, wherein the control logic circuit is configured to determine the amount of the power received from the power supply via a single pull-up resistor within the power supply.

4. The charger of claim 1, wherein the control logic circuit includes a feedback circuit configured to output an amount of power indicative of an amount of power available to be allocated to one or more of the devices.

5. The charger of claim 4, wherein the feedback circuit is configured to receive power from at least one selected from the group consisting of a pull-down resistor, a current limiter, and a current amplifier.

6. The charger of claim 5, wherein the power from at least one selected from the group consisting of the pull-down resistor, the current limiter, and the current amplifier correlates to an amount of power supplied to one of the plurality of output ports coupled to one of the plurality of devices or the amount of the received power.

7. The charger of claim 4, wherein the feedback circuit is configured to receive power from a current limiter and wherein the current limiter adjusts the amount of power supplied to one of the plurality of output ports based on the output from the feedback circuit.

8. The charger of claim 4, wherein the feedback circuit includes an adder circuit and a subtraction circuit.

9. A charger comprising:
    a USB type-C input port configured to receive power from a power supply;
    a first output port configured to provide power to a first device;
    a second output port configured to provide power to a second device; and
    a control logic circuit configured to, while the first device is coupled to the first output port and the second device is coupled to the second output port,
        provide at least a portion of the received power to the first device via the first output port;
        determine an amount of the received power available to charge the second device via the second output port while providing the at least a portion of the received power to the first device; and
        when there is an amount of the received power available to charge the second device, provide the amount of the received power available to the second device via the second output port,
    wherein the control logic circuit is hardwired to prioritize power to the first output port when the first output port is coupled to the first device such that an amount of the received power is allocated to the first output port instead of the second output port when the second output port is coupled to the second device, wherein the control logic circuit is non-programmable and does not include a general purpose microprocessor and wherein the allocation of the amount of received power to the first output port is performed independently of a general purpose microprocessor.

10. The charger of claim 9, further comprising a third output port to charge a third device and wherein the control logic circuit is further configured to, when the third device is coupled to the third output port,
    provide at least a portion of the received power to the third device via the third output port;
    determine whether there is a second amount of received power available for charging the second device via the second output port while providing the at least a portion of the received power to the first device via the first output port and the at least a portion of the received power to the third device via the third output port; and
    when there is a second amount of received power available, provide the second amount of received power to the second device via the second output port.

11. The charger of claim 10, wherein the control logic circuit is configured to determine the second amount of received power available based on a charge level of the third device.

12. The charger of claim 9, wherein the control logic circuit is configured to determine whether there is an amount of the received power available via a single pull-up resistor within the power supply.

13. The charger of claim 9, wherein the control logic circuit includes a feedback circuit configured to output an amount of power indicative of an amount of power available to be allocated to one or more of the charging devices.

14. The charger of claim 13, wherein the feedback circuit is configured to receive power from at least one selected from the group consisting of a pull-down resistor, a current limiter, and a current amplifier.

15. The charger of claim 14, wherein the power from at least one selected from the group consisting of the pull-down resistor, the current limiter, and the current amplifier correlates to an amount of power supplied to one of the first and second output ports coupled to one of the first and second devices or the amount of the received power.

16. The charger of claim 14, wherein the current limiter adjusts the amount of power supplied to the one of the first and second output ports based on the output from the feedback circuit.

17. The charger of claim 13, wherein the feedback circuit includes an adder circuit and a subtraction circuit.

18. The charger of claim 9, wherein the control logic circuit is further configured to adjust a total resistive value of a pull-up resistor circuit coupled to at least one selected from the group consisting of the first output port and the second output port based on the output from the feedback circuit wherein the total resistive value of the pull-up resistor circuit indicates the amount of power supplied to the at least one selected from the group consisting of the first output port and the second output port.

19. The charger of claim 9, wherein at least one of the first and second output ports is a USB type-C port.

* * * * *